(12) United States Patent
Hara et al.

(10) Patent No.: US 8,519,689 B2
(45) Date of Patent: Aug. 27, 2013

(54) SWITCHING REGULATOR

(75) Inventors: Kiyohito Hara, Hyogo (JP); Hirohisa Abe, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 203 days.

(21) Appl. No.: 13/205,109

(22) Filed: Aug. 8, 2011

(65) Prior Publication Data

US 2012/0049828 A1  Mar. 1, 2012

(30) Foreign Application Priority Data

Aug. 31, 2010  (JP) ................................. 2010-194198

(51) Int. Cl.
*G05F 1/40* (2006.01)
(52) U.S. Cl.
USPC ............................. 323/282; 323/222; 323/284
(58) Field of Classification Search
USPC ........................... 323/222, 282–285, 288, 351
See application file for complete search history.

(56) References Cited

U.S. PATENT DOCUMENTS

| 7,701,181 B2 * | 4/2010 | Inoue | 323/268 |
| 7,831,851 B2 * | 11/2010 | Yoshii | 713/324 |
| 2009/0316311 A1 | 12/2009 | Hara et al. | |
| 2009/0323231 A1 | 12/2009 | Hara | |
| 2010/0007999 A1 * | 1/2010 | Iwata | 361/18 |

FOREIGN PATENT DOCUMENTS

| JP | 2008-160951 | 7/2008 |
| JP | 2009-22092 | 1/2009 |
| JP | 2009-55708 | 3/2009 |
| JP | 2009-178033 | 8/2009 |
| JP | 2010-10527 | 1/2010 |
| JP | 2010-11529 | 1/2010 |

* cited by examiner

*Primary Examiner* — Jessica Han
(74) *Attorney, Agent, or Firm* — Cooper & Dunham LLP

(57) ABSTRACT

A switching regulator converts an input voltage into an output voltage, wherein an operation of the switching regulator is stopped by an enable signal in a standby status. The switching regulator includes a switching transistor performing switching in accordance with a control signal; an inductor that is charged with the input voltage by the switching transistor; a rectifying transistor including a bipolar transistor discharging the inductor when the switching transistor is turned off; a control circuit unit controlling the switching transistor such that a voltage proportional to the output voltage becomes equal to a reference voltage; and a rectifying transistor control circuit unit turning off the rectifying transistor in a cut-off state upon reception of the enable signal indicating the standby status or connecting a base and a collector of the rectifying transistor upon reception of the enable signal indicating a normal operation so that a diode is formed.

13 Claims, 7 Drawing Sheets

SWITCHING REGULATOR

BACKGROUND OF THE INVENTION

1. Field of the Invention

The present invention relates to a step-up switching regulator that controls an output voltage by an input voltage control signal. Particularly, the present invention relates to a switching regulator that controls an output rectifying circuit by monitoring the voltage control signal.

2. Description of the Related Art

FIG. 8 is a circuit diagram of a step-up switching regulator 100 according to the related art. The switching regulator 100 steps up a power supply voltage Vcc to a predetermined voltage and outputs an output voltage Vout at an output terminal OUT. The step-up switching regulator 100 performs a PWM control to control the on-duty cycle of a switching transistor MN101 such that a divided voltage Vfb obtained by dividing the output voltage Vout is equal to a predetermined reference voltage Vref.

In the example of FIG. 8, a diode D101 is used as a rectifying element. In this case, the power supply voltage Vcc is output to the output terminal OUT at the time of shut-down. This is a problem of step-up switching regulators. In order to solve the problem, a circuit configuration illustrated in FIG. 9 has been proposed. The circuit of FIG. 9 includes a synchronous-rectifying transistor MP101 as a rectifying element to which a signal synchronized with the gate voltage of a switching transistor MN101 is input. The circuit also includes a transistor MP102 connected in series with the synchronous-rectifying transistor MP101 in order to prevent the output of the power supply voltage Vcc to the output terminal OUT upon shut-down (see Japanese Laid-open Patent Publication No. 2009-178033, for example).

However, in the configuration of FIG. 9, an inductor current flows backward in a light-load status, thereby reducing efficiency. Thus, the transistor MP102 needs to be controlled by detecting the light-load status. However, the control requires a complicated circuit and is not easy to perform.

SUMMARY OF THE INVENTION

In view of the foregoing, it is a general object of the present invention to overcome the problems of the related art. A more specific object of the invention may be to provide a switching regulator including a bipolar transistor as a rectifying element and capable of preventing a backflow of an inductor current, controlling the bipolar transistor with a simple circuit configuration, preventing the output of the power supply voltage to the output terminal upon shutdown, and appropriately controlling the operation of the load circuit.

In one aspect of the present invention, a switching regulator includes an input terminal to which an input voltage is input; an output terminal via which an output voltage obtained by converting the input voltage into a predetermined voltage by an operation of the switching regulator is output, wherein the operation of the switching regulator is stopped by an enable signal in a standby status; a switching transistor configured to perform switching in accordance with a control signal input to the switching transistor; an inductor configured to be charged with the input voltage by the switching of the switching transistor; a rectifying transistor including a bipolar transistor configured to discharge the inductor when the switching transistor is turned off and the charging of the inductor is stopped; a control circuit unit configured to control the switching of the switching transistor such that a proportional voltage proportional to the output voltage becomes equal to a reference voltage; and a rectifying transistor control circuit unit configured to control an operation of the rectifying transistor in accordance with the enable signal. The rectifying transistor control circuit unit turns off the rectifying transistor and places the rectifying transistor in a cut-off state upon reception of the enable signal indicating the standby status. The rectifying transistor control circuit unit connects a base and a collector of the rectifying transistor so that a diode is formed upon reception of the enable signal indicating a normal operation.

DETAILED DESCRIPTION OF THE PREFERRED EMBODIMENTS

Embodiments of the present embodiment are described with reference to the attached drawings.

First Embodiment

Figure 1:
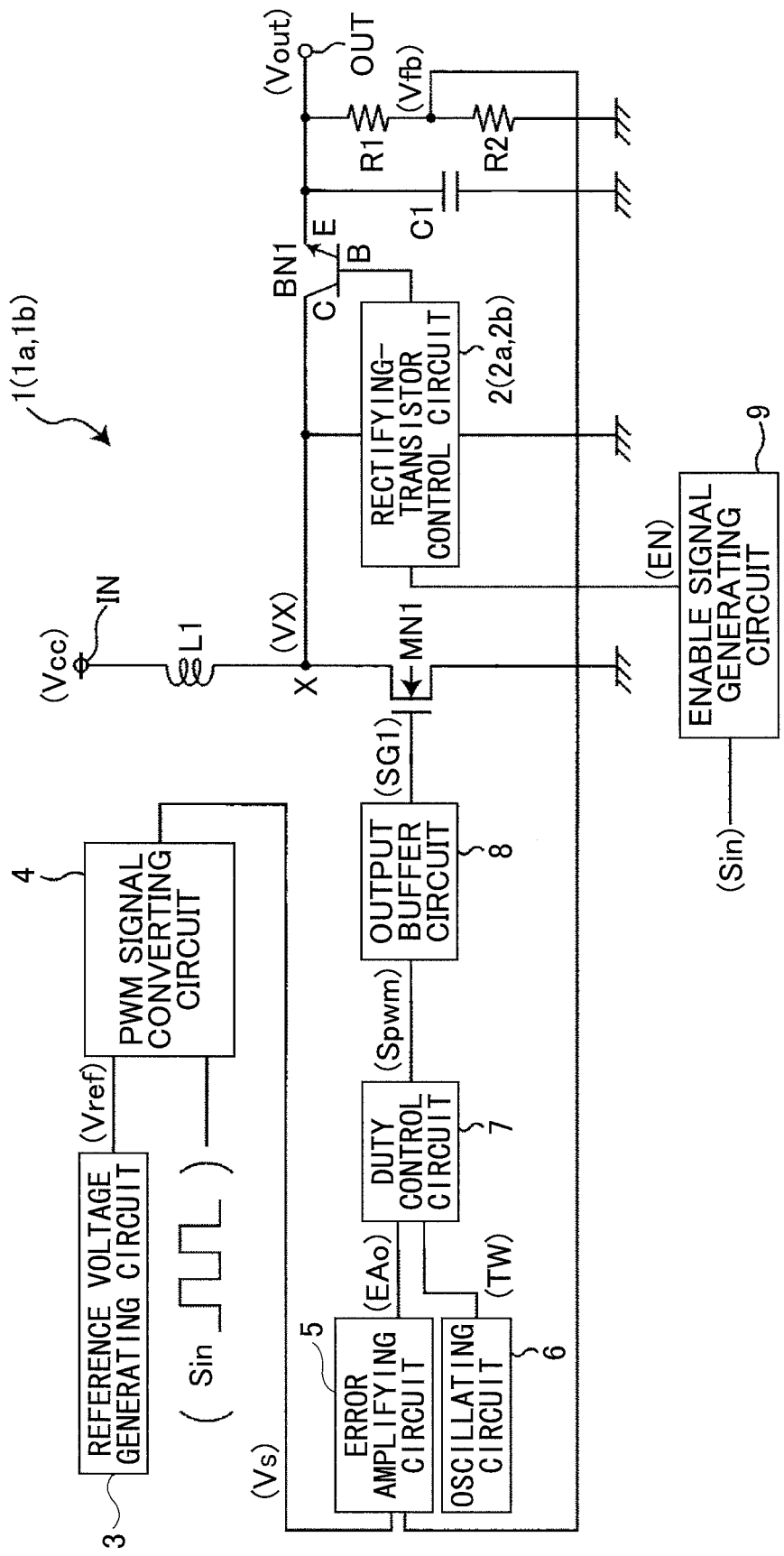
FIG. 1 illustrates a circuit configuration of a switching regulator according to a first embodiment of the present invention.

FIG. 1 illustrates a circuit configuration of a switching regulator 1 according to a first embodiment of the present invention. The switching regulator 1 is a step-up switching regulator that steps up a power supply voltage Vcc input to an input terminal IN as an input voltage to a predetermined voltage, and outputs the predetermined voltage at an output terminal OUT as an output voltage Vout. The voltage value of the output voltage Vout can be varied by a voltage control signal Sin that is input from the outside.

In FIG. 1, the switching regulator 1 includes an inductor L1, a switching transistor MN1 which is an NMOS transistor that performs switching for a step-up operation for stepping up the power supply voltage Vcc in accordance with the input control signal. When the switching transistor MN1 is turned on and placed in a conductive state, the switching transistor MN1 charges the inductor L1 with the power supply voltage Vcc. The switching regulator 1 further includes a rectifying transistor BN1 as a rectifying element which is an NPN transistor, and a rectifying transistor control circuit 2 that controls an operation of the rectifying transistor BN1.

The switching regulator 1 further includes a reference voltage generating circuit 3 that generates and outputs a predetermined reference voltage Vref; a PWM signal converting circuit 4 that outputs a reference voltage Vs by varying the voltage value of the reference voltage Vref in accordance with a voltage control signal Sin that is input from the outside; resistors R1 and R2 for output voltage detection; a smoothing capacitor C1; an error amplifying circuit 5; an oscillating circuit 6 that generates and outputs a predetermined triangular wave signal TW; a duty control circuit 7 including a PWM comparator; an output buffer circuit 8; and an enable signal generating circuit 9 that generates and outputs a predetermined enable signal EN in accordance with the voltage control signal Sin. The switching regulator 1 is placed in a standby status and its operation is stopped in accordance with the voltage control signal Sin. Specifically, the switching regulator 1 is placed in a standby status and its operation is stopped in accordance with the enable signal EN generated by the enable signal generating circuit 9.

The rectifying transistor control circuit 2 provides a rectifying transistor control circuit unit. The reference voltage generating circuit 3, the PWM signal converting circuit 4, the error amplifying circuit 5, the oscillating circuit 6, the duty control circuit 7, the output buffer circuit 8, and the resistors R1 and R2 provide control circuit units. The enable signal generating circuit 9 provides an enable signal generating circuit unit. The circuits of the switching regulator 1 other than the inductor L1 and the capacitor C1 may be integrated into an IC (integrated circuit). Preferably, the circuits other than at least one of the switching transistor MN1 and the rectifying transistor BN1, the inductor L1, and the capacitor C1 may be integrated into an IC.

The inductor L1 is connected between the power supply voltage Vcc and the drain of the switching transistor MN1. A connecting portion X between the inductor L1 and the drain of the switching transistor MN1 is connected to the collector of the rectifying transistor BN1. The emitter of the rectifying transistor BN1 is connected to the output terminal OUT.

The voltage control signal Sin is input to the enable signal generating circuit 9. The enable signal generating circuit 9 outputs the enable signal EN generated in accordance with the voltage control signal Sin to the rectifying transistor control circuit 2. The enable signal generating circuit 9 may generate the enable signal EN in accordance with a duty cycle or a period of the voltage control signal Sin as a pulse signal. For example, the enable signal generating circuit 9 generates the enable signal EN in accordance with the number of pulses having a predetermined signal level in the voltage control signal Sin that is input in a predetermined time.

The rectifying transistor control circuit 2 is connected between a voltage Vx of the connecting portion X and a ground voltage. The rectifying transistor control circuit 2 controls an operation of the rectifying transistor BN1 in accordance with the enable signal EN output from the enable signal generating circuit 9.

The capacitor C1 and a series connection of the resistors R1 and R2 are connected between the output terminal OUT and the ground voltage. A divided voltage Vfb is output from a connecting portion between the resistors R1 and R2. The reference voltage Vref is input to the PWM signal converting circuit 4. The PWM signal converting circuit 4 may output the reference voltage Vs by varying the voltage value of the input reference voltage Vref in accordance with a pulse signal of the voltage control signal Sin. Preferably, the PWM signal converting circuit 4 may generate the reference voltage Vs in accordance with a duty cycle or a period of the voltage control signal Sin. Preferably, the PWM signal converting circuit 4 may generate the reference voltage Vs in accordance with the number of pulses having a predetermined signal level in the voltage control signal Sin that is input in a predetermined time.

The reference voltage Vs is input to one input terminal of the error amplifying circuit 5 while the divided voltage Vfb is input to the other input terminal of the error amplifying circuit 5. The error amplifying circuit 5 outputs an error signal EAo at its output terminal which is generated by amplifying a voltage difference between the input divided voltage Vfb and the reference voltage Vs.

The duty control circuit 7 generates and outputs a PWM signal Spwm (pulse signal) by comparing voltages between the error signal EAo and the triangular wave signal TW from the oscillating circuit 6. Namely, the duty control circuit 7 may generate and output the PWM signal Spwm by pulse-width modulating the error signal EAo from the error amplifying circuit 5 with the triangular wave signal TW. The PWM signal Spwm is input to the gate of the switching transistor MN1 via the output buffer circuit 8 as a control signal SG1.

In this configuration, during a normal operation, when the output voltage Vout of the switching regulator 1 is increased, the voltage of the error signal EAo from the error amplifying circuit 5 is decreased, so that the duty cycle of the PWM signal Spwm from the duty control circuit 7 becomes smaller. As a result, the time in which the switching transistor MN1 is on becomes shorter, so that the output voltage Vout of the switching regulator 1 is controlled to be decreased. When the output voltage Vout of the switching regulator 1 is reduced, the voltage of the error signal EAo from the error amplifying circuit 5 increases, so that the duty cycle of the PWM signal Spwm from the duty control circuit 7 is increased. As a result, the time in which the switching transistor MN1 is on is increased, thus controlling the output voltage Vout to be increased. Such an operation is repeated, whereby the output voltage Vout is controlled to be constant at a predetermined voltage.

The PWM signal converting circuit 4 generates the reference voltage Vs in accordance with the pulse signal of the voltage control signal Sin. Thus, the PWM signal converting circuit 4 can vary the voltage value of the reference voltage Vs output to the error amplifying circuit 5 in accordance with the duty cycle of the input voltage control signal Sin. In this way, the on-duty cycle of the switching transistor MN1 can be controlled to set the output voltage Vout to a desired value.

Figure 2:
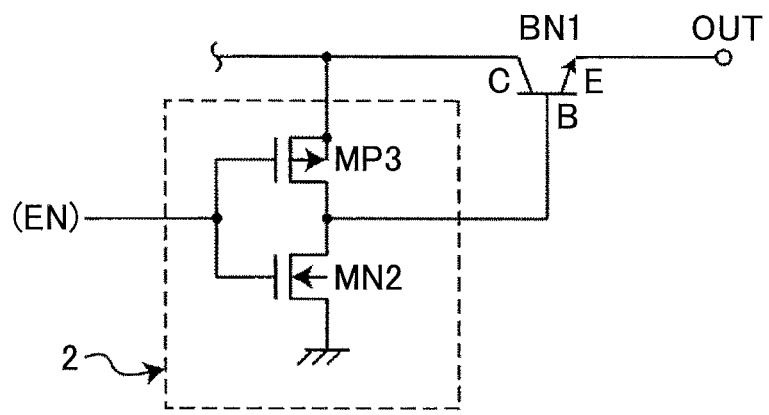
FIG. 2 illustrates an example of a rectifying transistor control circuit of the switching regulator according to the first embodiment.

Next, an operation of the rectifying transistor BN1 is described. FIG. 2 illustrates an example of the rectifying transistor control circuit 2 of FIG. 1. In FIG. 2, the rectifying transistor control circuit 2 includes a PMOS transistor MP3 and a NMOS transistor MN2. The PMOS transistor MP3 and the NMOS transistor MN2 are connected in series between the connecting portion X and the ground voltage. The gate of the PMOS transistor MP3 and the gate of the NMOS transistor MN2 are connected at a connecting portion. To the connecting portion, the enable signal EN from the enable signal generating circuit 9 is input. The PMOS transistor MP3 provides a first switch element, and the NMOS transistor MN2 provides a second switch element.

The enable signal generating circuit 9 outputs the enable signal EN of a high level when the voltage control signal Sin does not have a predetermined signal level, such as a high level, for a predetermined time or more. In this case, the PMOS transistor MP3 is turned off and placed in a cut-off state, while the NMOS transistor MN2 is turned on and placed in a conductive state. Thus, the connection between the collector and the base of the rectifying transistor BN1 is cut off, and the base of the rectifying transistor BN1 is connected to the ground voltage. As a result, the rectifying transistor BN1 is turned off and placed in a cut-off state, so that the power supply voltage Vcc and the output terminal OUT can be isolated from each other.

The status in which the voltage control signal Sin does not have a high level for the predetermined time or more also means placing the switching regulator 1 in a standby status in which the operation of the switching regulator 1 is stopped. The enable signal EN from the enable signal generating circuit 9 provides a signal for controlling the driving of the switching regulator 1, and the voltage control signal Sin provides an enable signal for the switching regulator 1. While not illustrated in FIG. 1, the enable signal EN may be input to all of the circuits of the switching regulator 1 except for the enable signal generating circuit 9, so that the operation of the switching regulator 1 can be stopped when the enable signal EN is at a high level.

On the other hand, when the voltage control signal Sin has a high level for the predetermined time or more, i.e., when the voltage control signal Sin is intended to activate the switching regulator 1, the enable signal generating circuit 9 outputs the enable signal EN of a low level. Thus, the PMOS transistor MP3 is turned on and placed in a conductive state, while the NMOS transistor MN2 is turned off and placed in a cut-off state, so that the collector and the base of the rectifying transistor BN1 is placed in a short-circuited state. As a result, when the switching transistor MN1 is turned off during the operation of the switching regulator 1 and the voltage VX at the connecting portion X is increased, a voltage equal to or more than the threshold voltage Vf is applied between the base and the emitter of the rectifying transistor BN1. As a result, a current is injected from the base to the emitter of the rectifying transistor BN1, causing a current to also flow from the collector to the emitter of the rectifying transistor BN1. Such an operation of the rectifying transistor BN1 is similar to that of rectification by a diode and involves bipolar operation. Thus, improved current drive performance can be obtained, the required space can be reduced, and the size of the apparatus can be reduced.

Thus, in the switching regulator according to the first embodiment, when the switching transistor MN1 is turned off and charging of the inductor L1 is stopped, the bipolar transistor of the rectifying transistor BN1 is used for discharging the inductor L1. In response to the input of the enable signal EN indicating a standby status, the rectifying transistor BN1 is turned off and placed in a cut-off state. In response to the input of the enable signal EN indicating a normal operation, the base and the collector of the rectifying transistor BN1 are connected, forming a diode. In this way, backflow of the inductor current can be prevented, and the rectifying element can be controlled by a simple circuit configuration. Thus, the output of the power supply voltage to the output terminal Vout upon shutdown can be prevented, and the operation of a load circuit can be appropriately controlled.

Second Embodiment

In accordance with a second embodiment, a switching regulator 1a includes a rectifying transistor control circuit 2a that connects the output terminal OUT to the ground voltage in accordance with the enable signal EN. Illustration of an overall circuit configuration of the switching regulator 1a according to the second embodiment is omitted because it is similar to the first embodiment illustrated in FIG. 1 with the exception that the rectifying transistor control circuit 2 is replaced with the rectifying transistor control circuit 2a.

Figure 3:
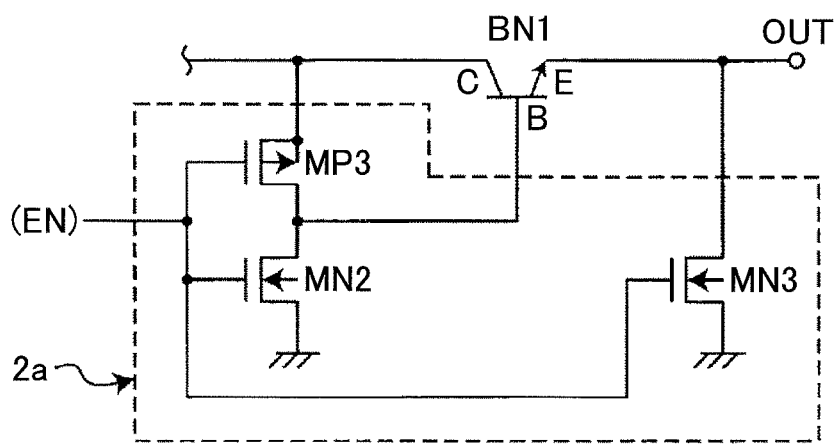
FIG. 3 illustrates an example of a rectifying transistor control circuit of the switching regulator according to a second embodiment.

FIG. 3 illustrates an example of the rectifying transistor control circuit 2a. Parts or elements similar to those of FIG. 2 are designated with similar reference numerals or signs and their description is omitted. The following description is concerned with the differences from FIG. 2.

The rectifying transistor control circuit 2a of FIG. 3 differs from the rectifying transistor control circuit 2 of FIG. 2 in that a NMOS transistor MN3 is additionally provided for connecting the output terminal OUT to the ground voltage in accordance with the enable signal EN. The rectifying transistor control circuit 2a provides a rectifying transistor control circuit unit. The various circuits in the switching regulator 1a except for the inductor L1 and the capacitor C1 may be integrated into an IC. Preferably, the circuits except for at least one of the switching transistor MN1 and the rectifying transistor BN1, the inductor L1, and the capacitor C1 may be integrated into an IC.

In the example of FIG. 3, the rectifying transistor control circuit 2a includes the PMOS transistor MP3 and the NMOS transistors MN2 and MN3. The NMOS transistor MN3 is connected between the output terminal OUT and the ground voltage. The enable signal EN from the enable signal generating circuit 9 is input to the gate of the NMOS transistor MN3. The NMOS transistor MN3 provides a third switch element.

When the enable signal EN has a high level such that the switching regulator 1a is placed in a standby status, the NMOS transistor MN3 is turned on and placed in a conductive state, so that the output terminal OUT is connected to the ground voltage. When the enable signal EN has a low level, the NMOS transistor MN3 is turned off and placed in a cut-off state, and the rectifying transistor control circuit 2a performs the same operation as that of the rectifying transistor control circuit 2 of FIG. 2.

In this way, the same effects as those of the first embodiment can be obtained, while the output voltage Vout of the switching regulator 1 can be immediately lowered to the ground voltage when standby status.

Third Embodiment

In the first embodiment, the rectifying transistor BN1 is turned off at the same time that the switching transistor MN1 is turned off. When the rectifying transistor BN1 is turned off, there is no current path for releasing the energy stored in the inductor L1. As a result, a parasitic capacitor at the connecting portion X is charged and the voltage VX of the connecting portion X is increased. When the voltage VX exceeds a withstand voltage of the switching transistor MN1, problems may occur in the switching transistor MN1. Thus, in a switching regulator 1b according to the third embodiment, the enable signal EN is delayed before being input to the gate of the PMOS transistor MP3 and the gate of the NMOS transistor MN2.

Figure 4:
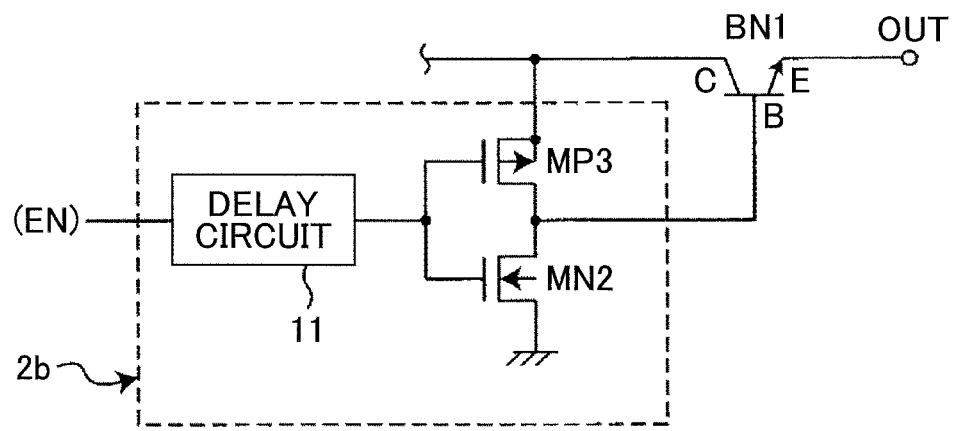
FIG. 4 illustrates an example of a rectifying transistor control circuit of the switching regulator according to a third embodiment.

Illustration of an overall circuit configuration of the switching regulator 1b according to the third embodiment is omitted because the configuration is similar to the first embodiment illustrated in FIG. 1 with the exception that the rectifying transistor control circuit 2 is replaced with a rectifying transistor control circuit 2b of FIG. 4.

FIG. 4 illustrates an example of the rectifying transistor control circuit 2b. In FIG. 4, parts or elements similar to those of FIG. 2 are designated with similar reference numerals or signs and their description is omitted. The following description is concerned with the differences from FIG. 2.

The example of FIG. 4 differs from that of FIG. 2 in that a delay circuit 11 is additionally provided for delaying the enable signal EN output to the gate of the PMOS transistor MP3 and the gate of the NMOS transistor MN2 by a predetermined time. The rectifying transistor control circuit 2b provides a rectifying transistor control circuit unit. The various circuits in the switching regulator 1b according to the third embodiment the except for the inductor L1 and the capacitor C1 may be integrated into an IC. Preferably, the circuits except for at least one of the switching transistor MN1 and the rectifying transistor BN1, the inductor L1, and the capacitor C1 may be integrated into an IC.

As illustrated in FIG. 4, the rectifying transistor control circuit 2b includes the PMOS transistor MP3, the NMOS transistor MN2, and the delay circuit 11. The enable signal EN is input to the delay circuit 11. The delay circuit 11 delays the input enable signal EN by a predetermined time and then outputs the delayed enable signal EN to the gate of the PMOS transistor MP3 and the gate of the NMOS transistor MN2.

When the enable signal EN has a high level such that the switching regulator 1 is placed in a standby status, the gate of the PMOS transistor MP3 and that of the NMOS transistor MN2 assume a high level after a predetermined time elapses from the time when the enable signal EN assumes a high level. When the enable signal EN has a low level, the gate of the PMOS transistor MP3 and that of the NMOS transistor MN2 assume a low level after a predetermined time elapses.

In this way, the same effects as those of the first embodiment can be obtained. In addition, when standby status, the switching transistor MN1 can be turned off first while the rectifying transistor BN1 can remain on until a predetermined time elapses after the switching transistor MN1 is turned off. The rectifying transistor BN1 can be turned off after the energy stored in the inductor L1 is sent to the output terminal OUT and delivered therefrom. Thus, upon transition to the standby status, a sharp increase of the voltage VX at the connecting portion X can be prevented, so that the problems in the switching transistor MN1 can be prevented.

Fourth Embodiment

In accordance with the fourth embodiment, the rectifying transistor control circuit 2 of the first embodiment is configured to discharge the base of the rectifying transistor BN1 in accordance with the control signal SG1.

Figure 5:
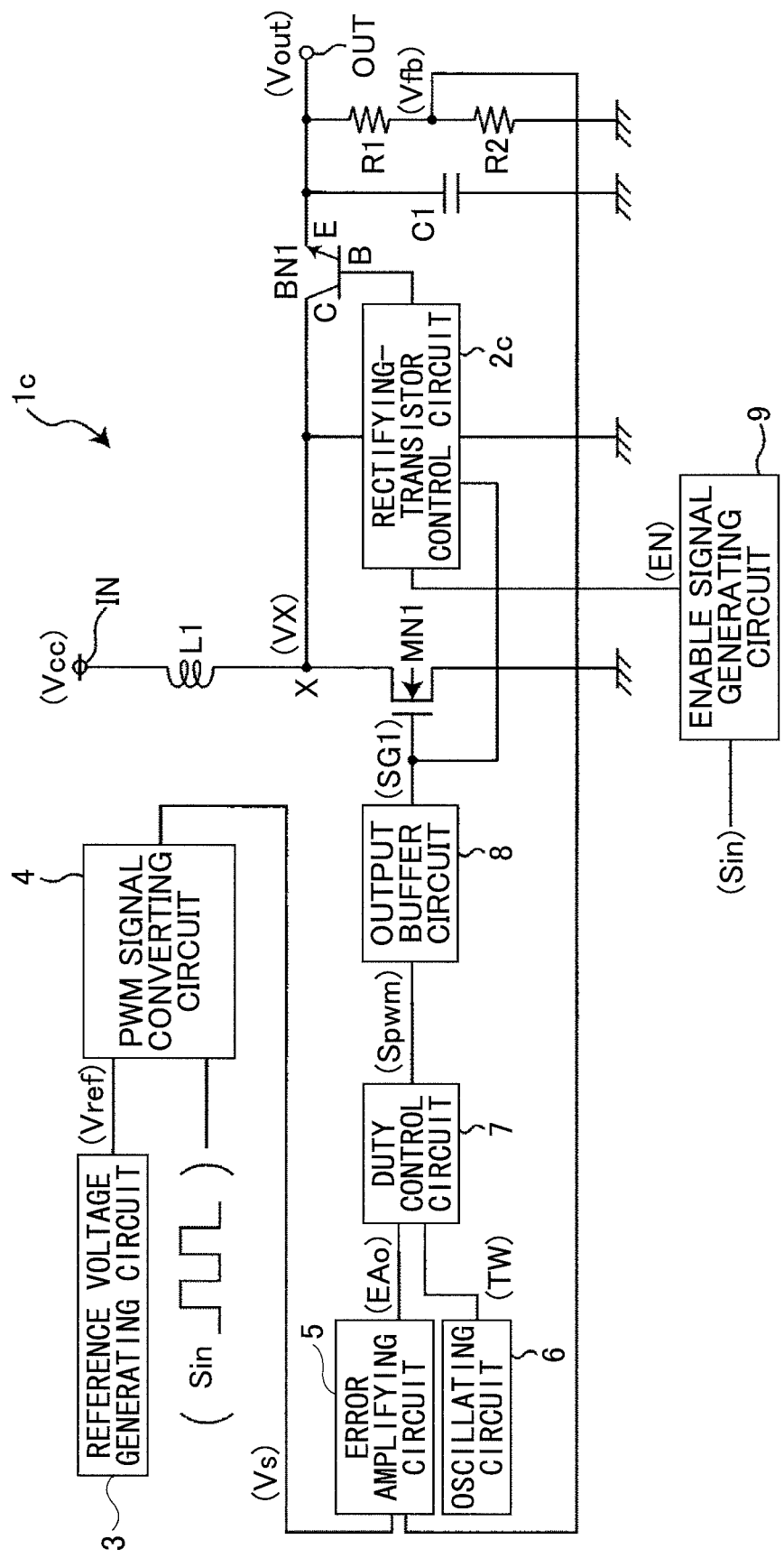
FIG. 5 illustrates a circuit configuration of the switching regulator according to a fourth embodiment.

FIG. 5 illustrates a switching regulator 1c according to the fourth embodiment. In FIG. 5, parts or elements similar to those of FIG. 1 are designated with similar reference numerals or signs and their description is omitted. The following description is concerned with the differences from FIG. 1.

The configuration of FIG. 5 differs from that of FIG. 1 in that the rectifying transistor control circuit 2 is replaced with a rectifying transistor control circuit 2c configured to discharge the charges at the base of the rectifying transistor BN1 in accordance with the control signal SG1.

The switching regulator 1c illustrated in FIG. 5 is a step-up switching regulator that steps up the power supply voltage Vcc input to the input terminal IN as an input voltage to a predetermined voltage, and outputs the stepped-up voltage at the output terminal OUT as an output voltage Vout. The voltage value of the output voltage Vout can be varied as desired by the voltage control signal Sin input from the outside.

In FIG. 5, the switching regulator 1c includes the inductor L1, the switching transistor MN1, the rectifying transistor BN1, the rectifying transistor control circuit 2c for controlling the operation of the rectifying transistor BN1, the reference voltage generating circuit 3, the PWM signal converting circuit 4, the resistors R1 and R2, the capacitor C1, the error amplifying circuit 5, the oscillating circuit 6, the duty control circuit 7, the output buffer circuit 8, and the enable signal generating circuit 9. The switching regulator 1c is placed in a standby status where its operation is stopped in accordance with the voltage control signal Sin. Specifically, the switching regulator 1c is placed in standby status and its operation is stopped in accordance with the enable signal EN generated by the enable signal generating circuit 9.

The rectifying transistor control circuit 2c provides a rectifying transistor control circuit unit. The circuits of the switching regulator 1c the except for the inductor L1 and the capacitor C1 may be integrated into an IC. Preferably, the circuits except for at least one of the switching transistor MN1 and the rectifying transistor BN1, the inductor L1, and the capacitor C1 may be integrated into an IC. In FIG. 5, illustration of the input of the enable signal EN to the circuits other than the rectifying transistor control circuit 2c is omitted, as in FIG. 1.

The rectifying transistor control circuit 2c is connected between the voltage Vx at the connecting portion X and the ground voltage. The rectifying transistor control circuit 2c controls the operation of the rectifying transistor BN1 in accordance with the enable signal EN output from the enable signal generating circuit 9. The rectifying transistor control circuit 2c also causes the charges at the base of the rectifying transistor BN1 to be discharged to the ground voltage in accordance with the control signal SG1.

Figure 6:
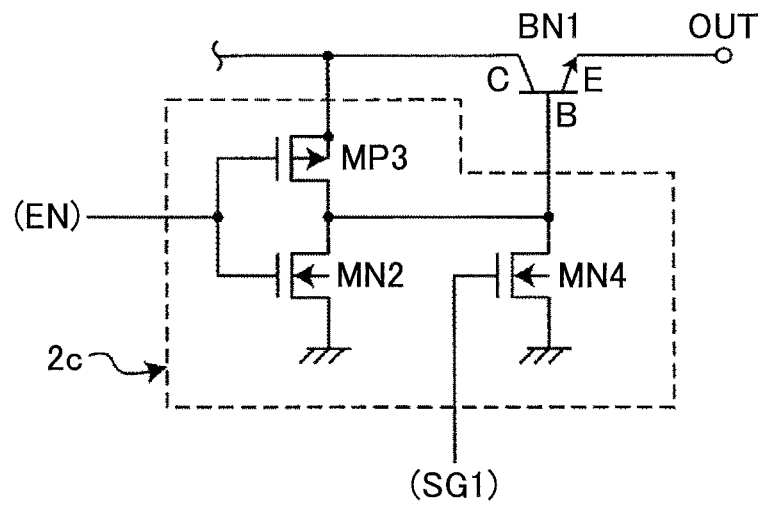
FIG. 6 illustrates an example of a rectifying transistor control circuit of the switching regulator according to the fourth embodiment.

FIG. 6 illustrates an example of the rectifying transistor control circuit 2c of FIG. 5. As illustrated, the rectifying transistor control circuit 2c includes the PMOS transistor MP3, the NMOS transistor MN2, and an NMOS transistor MN4. The NMOS transistor MN4 is connected between the base of the rectifying transistor BN1 and the ground voltage. The control signal SG1 is input to the gate of the NMOS transistor MN4.

When the switching regulator 1c is operating with the enable signal EN having a low level, the voltage at the connecting portion X is lowered to a voltage corresponding to the low level by the switching transistor MN1 in response to the control signal SG1 assuming a high level. At the same time, the base voltage of the rectifying transistor BN1 is also lowered to a voltage corresponding to the low level by the NMOS transistor MN4. At this time, if the resistor value of the PMOS transistor MP3 is large, a voltage equal to or more than the threshold voltage Vf may be caused across the base and the collector of the rectifying transistor BN1. As a result, a current may flow from the base to the collector of the rectifying transistor BN1, and further a current may flow from the emitter to the collector of the rectifying transistor BN1, possibly resulting in a decrease in efficiency of the switching regulator 1c.

In order to prevent such a problem, when the control signal SG1 has a high level, the charges at the base of the rectifying transistor BN1 are removed by the NMOS transistor MN4, so that no current flows from the base of the rectifying transistor BN1 via the PMOS transistor MP3, the connecting portion X, and the switching transistor MN1. In this way, development of a voltage equal to or more than the threshold voltage Vf between the base and the collector of the rectifying transistor BN1 can be prevented.

Thus, the switching regulator 1c according to the fourth embodiment can provide the same effects as those of the first embodiment while preventing the flow of a current from the emitter to the collector of the rectifying transistor BN1, thus preventing the decrease in efficiency.

While the rectifying transistor control circuit 2c of FIG. 6 has been described as being based on the circuit configuration of FIG. 2, the invention is not limited to such configuration.

Figure 7:
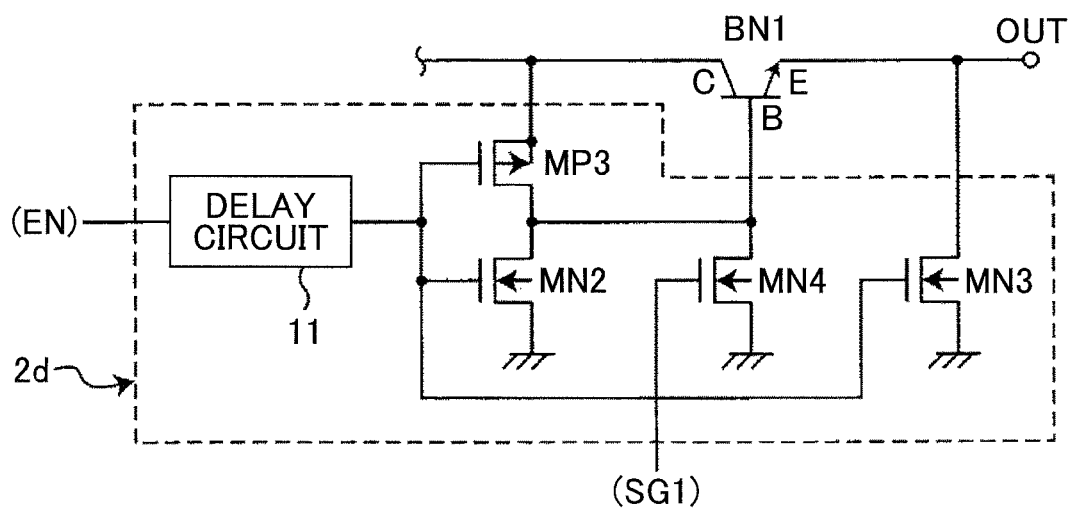
FIG. 7 illustrates another example of the rectifying transistor control circuit of the switching regulator according to the fourth embodiment.
Figure 8:
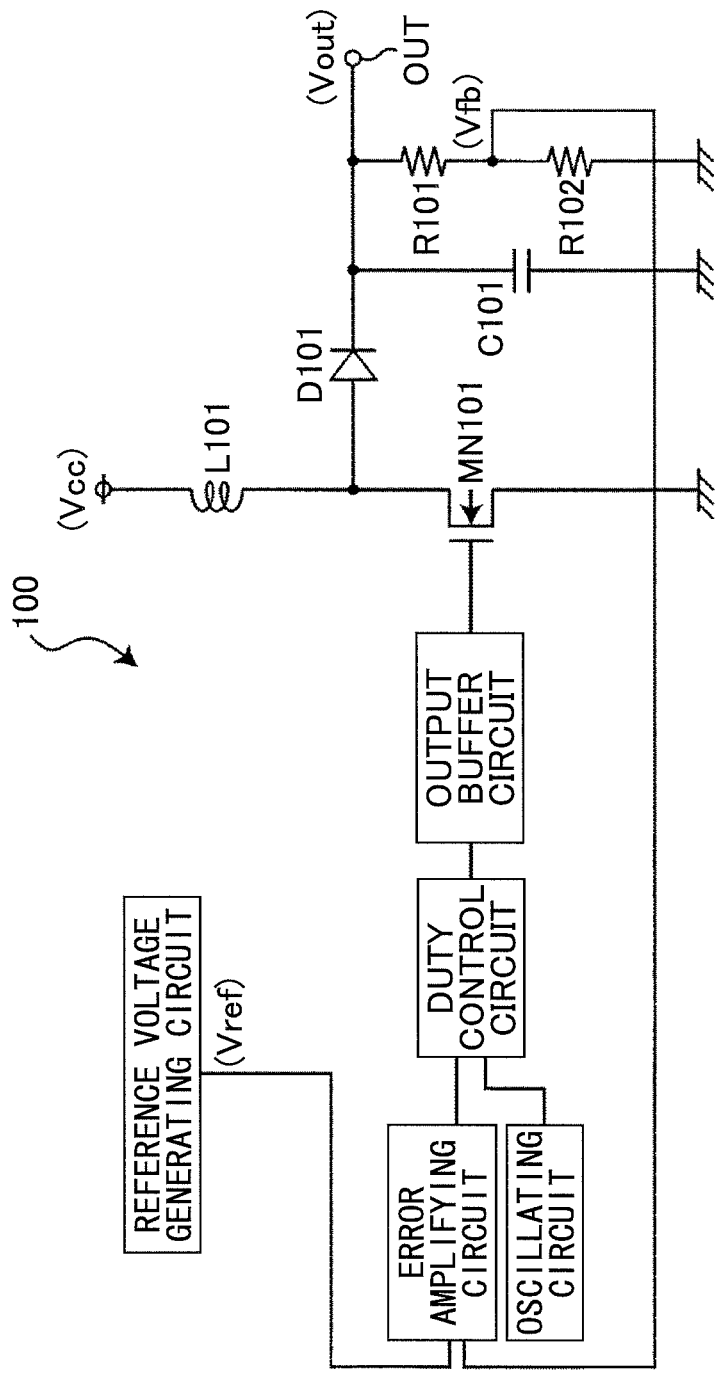
FIG. 8 illustrates a circuit configuration of a step-up switching regulator according to the related art.
Figure 9:
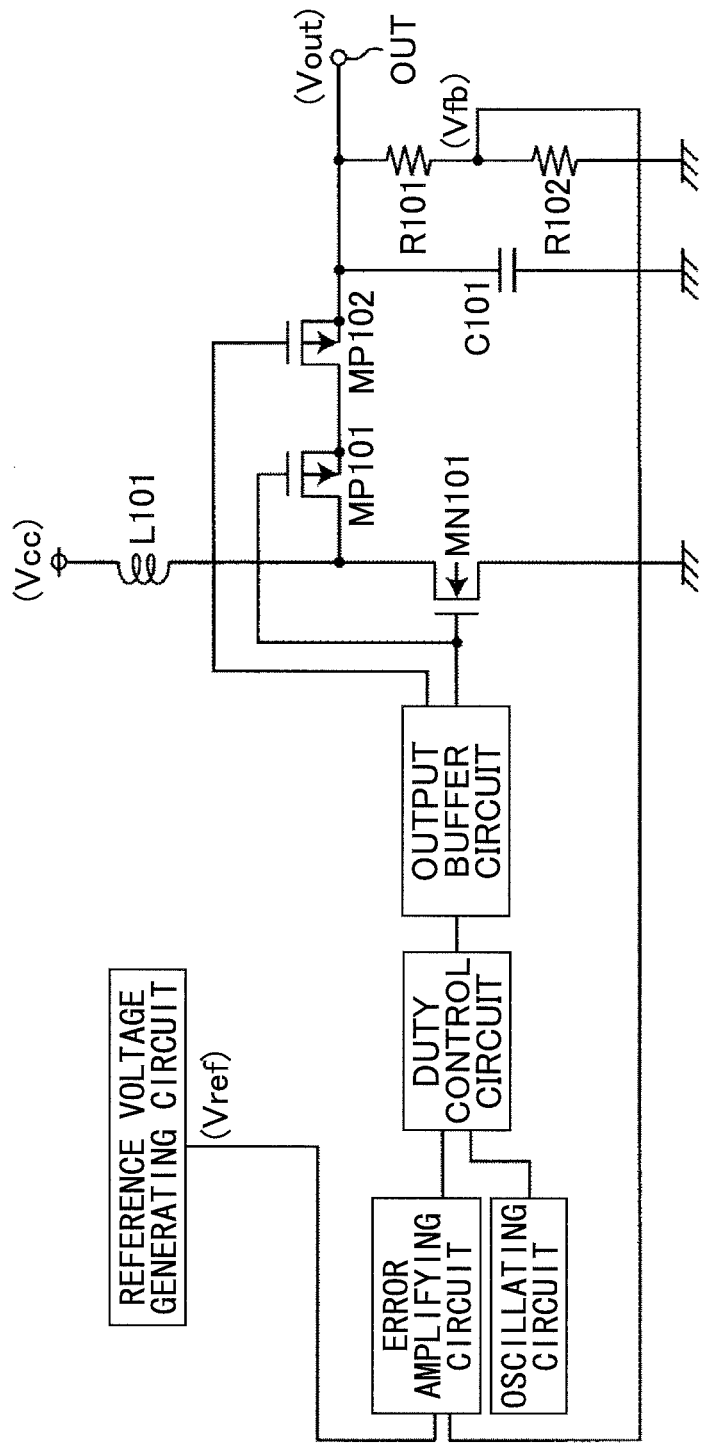
FIG. 9 illustrates a circuit configuration of another step-up switching regulator according to the related art.

Preferably, the rectifying transistor control circuit 2c may incorporate the circuit configuration of FIGS. 3 and/or 4. FIG. 7 illustrates a rectifying transistor control circuit 2d incorporating the circuit configurations of FIGS. 3 and 4 in the configuration of FIG. 6. The rectifying transistor control circuit 2d provides a rectifying transistor control circuit unit.

In the example of FIG. 7, the effects according to the first through the fourth embodiments can be obtained. Namely, the power supply voltage Vcc and the output voltage Vout can be isolated from each other at the time of standby; the output terminal OUT can be lowered to the ground voltage; the problems in the switching transistor MN1 due to the increase in the voltage of the connecting portion X upon transition to standby can be prevented; the flow of a current from the emitter to the collector of the rectifying transistor BN1 can be prevented when the control signal SG1 has a high level during the active period of the switching regulator; and the decrease in efficiency of the switching regulator can be prevented.

In the first through the fourth embodiments, the enable signal EN is generated by the enable signal generating circuit 9 from the voltage control signal Sin. Preferably, the enable signal generating circuit 9 may be omitted and the enable signal EN may be directly input to the rectifying transistor control circuit from the outside.

Thus, in accordance with the switching regulator according to an embodiment, when the switching transistor is turned off and the charging of an inductor is stopped, a bipolar transistor is used as a rectifying transistor for discharging the inductor. When the enable signal indicating a standby status is input, the rectifying transistor is turned off and placed in a cut-off state. When the enable signal indicating a normal operation is input, the base and the collector of the rectifying transistor are connected, forming a diode. In this way, backflow of an inductor current can be prevented, and the rectifying element can be controlled by a simple circuit configuration. Thus, the output of the power supply voltage to the output terminal upon shutdown can be prevented, and an operation of the load circuit can be appropriately controlled.

Preferably, when the enable signal indicating a standby status is input, the output terminal is connected to the ground voltage. Thus, the output voltage of the switching regulator can be immediately lowered to the ground voltage upon entering a standby status, so that a device connected to the switching regulator as a load can be prevented from being adversely affected.

Preferably, when the enable signal indicating a standby status is input, the rectifying transistor is turned off and placed in a cut-off state after a predetermined time elapses. When the enable signal indicating a normal operation is input, the base and the collector of the rectifying transistor is connected to form a diode after a predetermined time elapses. In this way, when standby status, the switching transistor can be turned off first and the rectifying transistor can remain on until a predetermined time elapses from when the switching transistor is turned off. Thus, the rectifying transistor can be turned off after the energy stored in the inductor is sent to the output terminal and delivered therefrom. In this way, the sharp increase of the voltage at the connecting portion between the inductor and the switching transistor can be prevented upon transition to the standby status, thus preventing the development of the problems in the switching transistor.

Preferably, when the switching transistor is turned on and placed in a conductive state, the base of the rectifying transistor is connected to a predetermined voltage such that the rectifying transistor can be turned off and placed in a cut-off state. In this way, the flow of a current from the emitter to the collector of the rectifying transistor can be prevented, thus preventing the decrease in efficiency.

Although this invention has been described in detail with reference to certain embodiments, variations and modifications exist within the scope and spirit of the invention as described and defined in the following claims.

The present application is based on Japanese Priority Application No. 2010-194198 filed Aug. 31, 2010, the entire contents of which are hereby incorporated by reference.

What is claimed is:

1. A switching regulator comprising:
   an input terminal to which an input voltage is input;
   an output terminal via which an output voltage obtained by converting the input voltage into a predetermined voltage by an operation of the switching regulator is output, wherein the operation of the switching regulator is stopped by an enable signal in a standby status;
   a switching transistor configured to perform switching in accordance with a control signal input to the switching transistor;
   an inductor configured to be charged with the input voltage by the switching of the switching transistor;
   a rectifying transistor including a bipolar transistor configured to discharge the inductor when the switching transistor is turned off and the charging of the inductor is stopped;
   a control circuit unit configured to control the switching of the switching transistor such that a voltage proportional to the output voltage becomes equal to a reference voltage; and
   a rectifying transistor control circuit unit configured to control an operation of the rectifying transistor in accordance with the enable signal,
   wherein the rectifying transistor control circuit unit turns off the rectifying transistor and places the rectifying transistor in a cut-off state upon reception of the enable signal indicating the standby status, and
   wherein, upon reception of the enable signal indicating a normal operation, the rectifying transistor control circuit unit connects a base and a collector of the rectifying transistor so that a diode is formed.

2. The switching regulator according to claim 1, wherein the rectifying transistor control circuit unit includes
   a first switch element configured to connect the base and the collector of the rectifying transistor upon reception of the enable signal indicating the normal operation; and
   a second switch element configured to connect the base of the rectifying transistor to a predetermined voltage at which the rectifying transistor is turned off and placed in the cut-off state upon reception of the enable signal indicating the standby status.

3. The switching regulator according to claim 1, wherein the rectifying transistor control circuit unit connects the output terminal to a ground voltage upon reception of the enable signal indicating the standby status.

4. The switching regulator according to claim 3, wherein the rectifying transistor control circuit unit includes a third switch element configured to connect the output terminal to the ground voltage upon reception of the enable signal indicating the standby status.

5. The switching regulator according to claim 1, wherein the rectifying transistor control circuit unit turns off the rectifying transistor and places the rectifying transistor in the cut-off state after a predetermined time elapses upon reception the enable signal indicating the standby status, and wherein, upon reception of the enable signal indicating the normal operation, the rectifying transistor control circuit unit connects the base and the collector of the rectifying transistor so that a diode is formed after the predetermined time elapses.

6. The switching regulator according to claim 5, wherein the rectifying transistor control circuit unit includes a delay circuit configured to delay the enable signal by the predetermined time.

7. The switching regulator according to claim 1, wherein the rectifying transistor control circuit unit connects the base of the rectifying transistor to a predetermined voltage such that the rectifying transistor is turned off and placed in the cut-off state when the switching transistor is turned on and placed in a conductive state.

8. The switching regulator according to claim 7, wherein the rectifying transistor control circuit unit includes a fourth switch element configured to connect the base of the rectifying transistor to a predetermined voltage at which the rectifying transistor is turned off and placed in the cut-off state in accordance with the control signal input to the switching transistor.

9. The switching regulator according to claim 1, wherein the control circuit unit generates the reference voltage having a voltage value in accordance with a voltage control signal that is externally input.

10. The switching regulator according to claim 9, wherein the voltage control signal includes a pulse signal, and
wherein the control circuit unit generates the reference voltage having a voltage value in accordance with a duty cycle of the pulse signal.

11. The switching regulator according to claim 9, wherein the voltage control signal includes a pulse signal,
wherein the control circuit unit counts the number of pulses having a predetermined signal level in the pulse signal that is input in a predetermined time and generates the reference voltage having a voltage value in accordance with the number of the pulses.

12. The switching regulator according to claim 9, further comprising an enable signal generating circuit unit configured to generate the enable signal from the voltage control signal.

13. The switching regulator according to claim 12, wherein the enable signal generating circuit unit generates the enable signal indicating the normal operation when the pulse signal of the voltage control signal has a predetermined signal level, and
wherein the enable signal generating circuit unit generates the enable signal indicating the standby status when the pulse signal of the voltage control signal has a signal level different from the predetermined signal level for a predetermined time or more.

* * * * *